United States Patent [19]

Bauer et al.

[11] 4,166,285
[45] Aug. 28, 1979

[54] ELECTRICAL CAPACITOR WITH A PLEATED METALLIZED PORTION AND A STARTING PORTION WOUND ABOUT THE LEAD WIRES

[75] Inventors: Robert E. Bauer, Lincolnshire; Charles C. Rayburn, Mount Prospect, both of Ill.

[73] Assignee: Illinois Tool Works Inc., Chicago, Ill.

[21] Appl. No.: 920,424

[22] Filed: Jun. 29, 1978

[51] Int. Cl.² ............................................. H01G 1/14
[52] U.S. Cl. .................................. 361/307; 29/25.42; 361/304
[58] Field of Search ....................... 361/304, 307, 301; 29/25.42; 242/56.1

[56] References Cited

U.S. PATENT DOCUMENTS

| | | | |
|---|---|---|---|
| 3,754,311 | 8/1973 | Rayburn | 29/25.42 |
| 3,854,075 | 12/1974 | Uhi | 361/304 X |
| 4,128,857 | 12/1978 | Rayburn | 361/301 |

Primary Examiner—E. A. Goldberg
Attorney, Agent, or Firm—Glenn W. Bowen; Robert W. Beart

[57] ABSTRACT

An electrical capacitor is formed which relies on a thin dielectric layer which is metallized on both sides to provide electrode areas to provide the major part of the capacitance of the capacitor. An unmetallized margin area runs along one side of the dielectric layer along one longitudinal edge of the dielectric layer and an unmetallized margin area runs along the other side of the dielectric layer along the opposite longitudinal edge dimension of the dielectric layer. A pleated capacitor section is formed by pleating, or folding, the dielectric layer along its longitudinal dimension. This pleated capacitor segment is incorporated into an initial portion of the capacitor formed of two metal foil electrodes and a separating dielectric layer which are wound about the leads of the capacitor.

6 Claims, 18 Drawing Figures

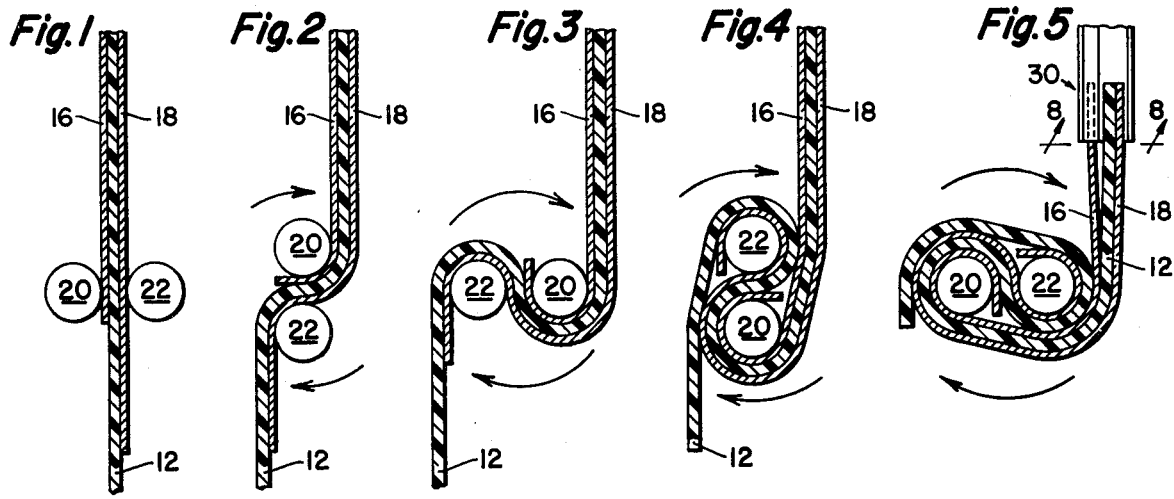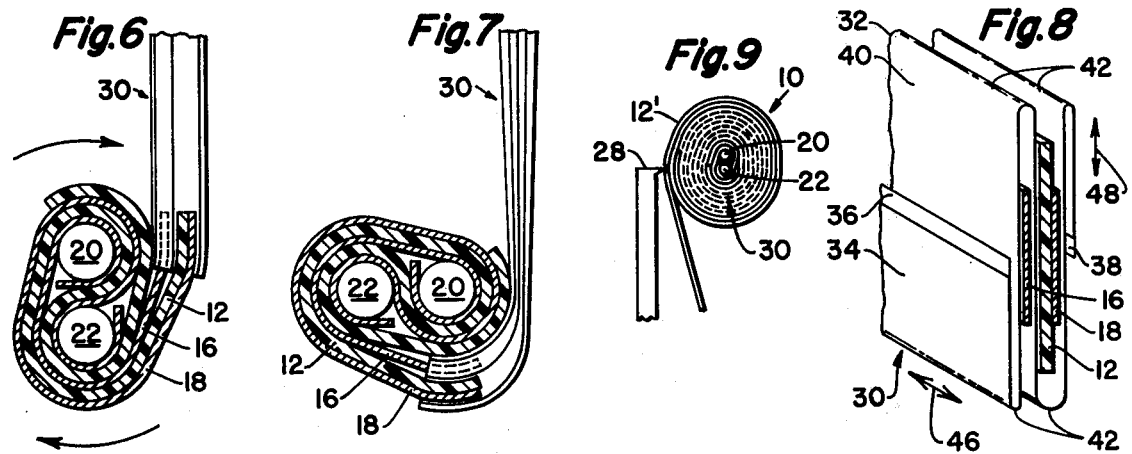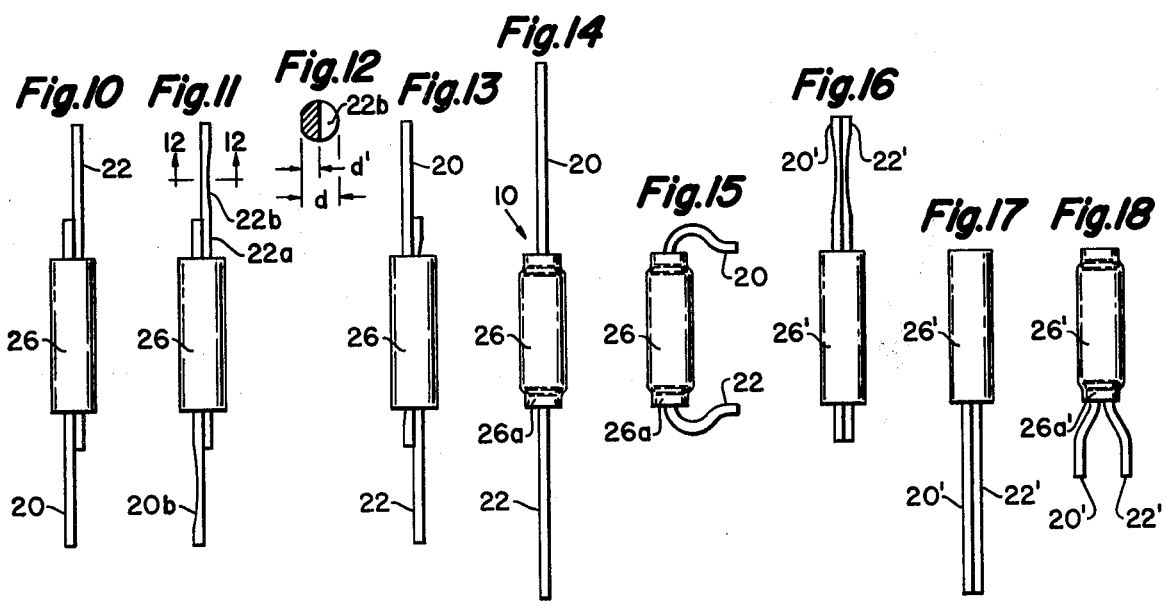

ELECTRICAL CAPACITOR WITH A PLEATED METALLIZED PORTION AND A STARTING PORTION WOUND ABOUT THE LEAD WIRES

BACKGROUND OF THE INVENTION

Electrical capacitors made of thin film dielectric material which is metallized on both sides are used in large quantities in electrical devices because of their reliability, their desirable electrical characteristics and their relatively low cost. U.S. Pat. No. 2,470,826 issued on May 24, 1949 to W. McMahon illustrates a capacitor in which a double sided metallized dielectric layer is folded an odd number of times in a longitudinal direction. Another double sided pleated metallized dielectric layer capacitor is disclosed in U.S. Pat. No. 3,854,075 issued Dec. 10, 1974, to John Phillip Uhl, and assigned to the assignee of the present invention. In the Uhl patent, a capacitor is disclosed which is formed by pleating a double side metallized dielectric layer an even number of times and then winding the structure about the leads which act as mandrels and are left in the structure. Spraying of the ends of the wound capacitor structure is, therefore, not needed or contemplated by the Uhl patent. The McMahon patent suggests that his dielectric material may then be wound along its longitudinal dimension after pleating and that end terminations may then be applied to a wound capacitor segment by spraying metal against the edges of the wound capacitor segment. The types of capacitors envisioned by the McMahon and Uhl patents, if commercially practicable, would be extremely desirable because substantially all of the dielectric layers of these capacitors are in the electric field and these capacitors may be made without the insertion of an additional dielectric layer in the main body of the capacitor, although a short initial unmetallized dielectric strip and a protective terminating dielectric strip could be employed with these capacitors, if desired.

The types of capacitor construction that were suggested in the McMahon and Uhl patents have a number of decided manufacturing and electrical advantages. For example, the problem of masking the dielectric layer during electrode evaporation when the electrode areas are applied to the film is substantially reduced. In addition, no slitting is required as it is during the manufacture of conventional wound film capacitors. Furthermore, the capacitance per unit dielectric area is maximized because of the substantially full use of the dielectric layer in the electric field. Shorter winding lengths per unit capacitance are thereby required, reducing the winding labor. The dielectric lengths can also be calibrated and pre-cut to produce a capacitor of more accurate values. Another advantage of these types of capacitors, if they can be made in a reliable manner, is that there are no air layers between the metallized electrodes and the pleated film surfaces and this substantially increases the voltage, for example, one hundred volts or more, at which corona discharge starts, making these capacitors commerically attractive for new applications such as fluorescent lighting circuits.

However, the construction of commercially successful capacitors as suggested in the McMahon and Uhl patents was hampered by problems that are presented by the attachment of leads to the wound capacitor segments. The McMahon patent suggested that leads could be attached to his capacitor by the well-known Schoop process. The application of high velocity metallic spray coatings to the edges of the capacitor described by McMahon is not commercially practical, however, because the spray will penetrate through the dielectric area at a pleat and thereby short one electrode to the other. If the temperature and pressure of the spray are lowered, penetration of the dielectric layers may be reduced but the adhesion of the metallic spray will generally be very poor. The multiple leads suggested in the McMahon patent also are not satisfactory since they tend to tear the dielectric material and to make the capacitor bulky and inductive.

In order to solve the above mentioned spray shorting problem at a pleated edge, it has been suggested in Australian Patent No. 159,958, patented on Nov. 24, 1954 to provide unmetallized dielectric strips behind all of the pleats of a pleated metallized capacitor. While this solution may provide a technically feasible method of attaching leads to a pleated metallized dielectric layer capacitor, the number of unmetallized strips that are required on the dielectric layer greatly complicates the manufacturing process for both the dielectric layer itself and the pleated capacitor product. For example, in a capacitor having five pleats, there must be, in addition to the two unmetallized margin areas, five unmetallized strips that run along the entire length of the dielectric material, with three of these strips being on one side of the dielectric layer and two of these strips being on the opposite side of the dielectric layer. It is apparent that the masking problems and the cost of manufacturing such a specialized item make the solution of the Australian patent commercially unattractive. This is especially true since the type of metallized dielectric layer that is used in the capacitor of the present invention, (in which only the margin areas are required), is readily commercially available.

The leads of the capacitor of the previously mentioned Uhl patent were used as mandrels to wind the pleated capacitor segment about the center, in a manner similar to that suggested in U.S. Pat. No. 2,887,649 issued May 19, 1959 to Daniel B. Peck. In the Uhl patent, conductive foil tabs were inserted between the leads and the metallized electrode areas to make positive contact with the electrode and to protect the electrode from damage by the leads during winding. However, it has been determined that this construction leads to a higher failure rate than desirable due to opening of the electrode area around the periphery of the metal foil, for reasons which are not completely understood.

The use of the leads of a wound capacitor as the winding mandrels is desirable in order to obtain secure lead attachment without the necessity of applying a metal end spray to the edges of the wound metallized capacitor segment after it is formed. U.S. Pat. No. 3,754,311 issued Aug. 28, 1973 in the name of Charles C. Rayburn, and assigned to the assignee of the present invention describes a wound film capacitor which uses the lead wires as winding mandrels.

In the capacitor of this patent a dielectric is sandwiched between two layers of metallized, or preferably foil, electrodes. A pair of lead wires are then positioned against the outer surfaces of the foils and rotated together in the manner of mandrels to wind the film and foil layers into a capacitor body. Flat, or otherwise deformed portions formed on a short portion of one end of each lead wire which is outside of the capacitor during winding are then drawn into the center of the capacitor by pulling on the other end of the wires. The capacitor body is then heated to shrink the dielectric and thereby cause the leads to be held in extremely firm engagement with the foil layers. Since the foils encircle at least 270° of the periphery of the lead wires, a very firm, low resistance, pressure bond is made which renders the capacitor able to withstand substantial amounts of heat applied during a soldering operation. The elimination of mandrel holes allows the capacitor to be extremely compact and usable for many applications without the addition of additional thicknesses of sealing materials.

The capacitor of the present invention utilizes a technique similar to that of Rayburn U.S. Pat. No. 3,754,311 to achieve the winding of an initial portion of the finished capacitor of the present invention; and thereafter, a pleated, double-sided, metallized dielectric layer is incorporated into the winding process. The finished capacitor, therefore, incorporates the many advantages of both the capacitor of U.S. Pat. No. 3,754,311 and of pleated, wound capacitors.

Various deficiencies of the prior art were overcome by the capacitor of the Rayburn U.S. Pat. No. 3,754,311 which consisted broadly of two or more layers of shrinkable thermoplastic dielectric film positioned, in sandwiched relation, between a pair of foil layers or strips, the outside surfaces of the foil layers being engaged by a pair of axially extending lead wires. The lead wires have flats or other deformations thereon which lock them to the foils after winding and heat shrinking the dielectric and prevent their being rotated in or being pulled out of the capacitor. Since it has been found that the foil and dielectric strips tend to wrinkle when wound about a lead of non-uniform cross-section, the capacitor was wound on smooth portions of the lead wires and the deformed lead portions were pulled axially inside the capacitor after the winding has been finished and the wraps sealed together, but prior to the heat shrinking operation.

The capacitor of this patent utilized the heat shrinkage characteristics of bi-axially oriented films. Such films include polyester, polypropylene, polystyrene, polycarbonate and combinations thereof. A variation in particular performance characteristics such as the dissipation factor and the temperature-capacitance relation, may be obtained by using a particular film or combination of films having the characteristics desired.

This capacitor had the advantage that relatively large, rigid leads are used, e.g., No. 20 or No. 22 AWG. The leads could be formed in either axial, radial or stand-up styles.

Although the capacitor system of the Rayburn patent and the capacitor of the present invention were designed for self-encasement, a variety of other coating systems are usable as permitted within the style and temperature limitations of the materials used for this type of capacitor. For example, the units may be epoxy dipped, phenolic dipped and waxed, molded, wrap and filled, potted or canned.

Since the lead wires serve as the winding mandrel and remain in place after winding, there is no possiblity of this type of capacitor gradually unwinding into the mandrel hole as is often possible in conventional winding systems using a retractable mandrel. The solid core of the capacitor produced by the lead wires is thus a basis for stable performance characteristics. Since the outer folds which contain the margin areas extend to approximately the center of the strip, conductivity exists between each turn of the capacitor so that no end spray operation is required and the turns of the capacitor are charged in parallel rather than in series.

Unlike conventional heat shrunk tab type construction, such as exemplified by U.S. Pat. No. 2,735,970, the lead wires have pressure contact over the entire foil width and for approximately 270° around their peripheries. This large amount of intimate pressure contact not only assures low contact resistance, but also permits the foils and lead wires to conduct and dissipate heat within the capacitor section and thus protect the dielectric from overheating in localized high temperature areas as the capacitor is soldered into its circuit application. By the provision of deformations such as flatted regions on the leads centrally of the capacitor section, the leads are strongly locked against translation and rotation.

DESCRIPTION OF THE DRAWINGS

FIGS. 1-7 are end cross-sectional views showing, respectively, the positions of the various foil and dielectric layers (enlarged for clarity) of the initial portion of the capacitor relative to each other and the lead wires: prior to winding; after one-quarter, one-half, three-quarters, one full, one full and one-quarter and one full and one half revolution of winding;

FIG. 8 is a cross-sectional view taken along line 8—8 of FIG. 5, which figure shows the point at which engagement of the pleated and the initial dielectric and foil portions of the capacitor of the present invention occurs;

FIG. 9 is a diagrammatic end view of the capacitor section illustrating the sealing and cutting off of the outer dielectric layer from its supply;

FIG. 10 is a top plan view of the capacitor immediately after a winding operation;

FIG. 11 is a top plan view similar to FIG. 10 wherein each of the lead wires has been deformed over a short section of its length;

FIG. 12 is an end sectional view of the deformed portion of one of the lead wires in FIG. 11 taken on the line 12—12.

FIG. 13 is a view similar to FIG. 11 illustrating an intermediate position in the pulling apart of the lead wires to bring the deformed sections thereon inside the capacitor;

FIG. 14 is a plan view similar to FIG. 13 showing the relationship of the lead wires to the capacitor after the deformed portions of the lead wires have been pulled completely into the capacitor and an outer dielectric layer heat shrunk around them;

FIG. 15 is a diagrammatic end cross-sectional view illustrating the general relationship of the lead wire cross-sections and the adjacent capacitor foil and film wraps after a winding operation and before the deformed lead sections of FIG. 11 are pulled into the center of the capacitor;

FIG. 16 is a view similar to FIG. 11 except that it shows a modification wherein the wires have been deformed at the same end of the capacitor;

FIG. 17 is a view similar to FIG. 15 showing the leads after they have been pulled into the capacitor; and FIG. 18 is a view similar to FIG. 17 but showing the leads after the capacitor has been heat shrunk and the leads have been bent and cut off to form stand-up leads.

TECHNICAL DESCRIPTION OF THE INVENTION

FIGS. 1-14 illustrate the process steps involved in making the improved capacitor 10 of the invention. The winding of the initial portion of the capacitor is shown in FIGS. 1–7. The initial winding step comprises placing a thermoplastic dielectric film strip 12, in sandwiched relationship between a pair of foil strips, 16, 18. Depending upon the voltage rating that the capacitor must have, the transverse width of the foil strips may be of varying amounts less than the width of the dielectric strips to provide the desired width of insulating margin portions. A pair of elongated lead wire members 20, 22, are placed on opposite sides of the film and foil layers 12, 16, 18 and mounted in winding head (not shown) which will rotate them in a clockwise direction about a common center between them so as to wind the layers in the manner shown in FIGS. 2–7 as the winding progresses. In FIG. 7, it can be seen that the foil layers 16, 18 will be held in intimate engagement with their respective lead wires 20, 22 over approximately 270° of the wire peripheries. It can be further seen that the foil layers 16, 18 are separated from each other at the center of the capacitor by the dielectric layer 12.

Either, or both, of the electrodes 16, 18 could be metallized directly onto one, or both, sides of a supporting dielectric layer, but a separate foil is preferred for these electrodes. A portion of a commercially available metallized dielectric film strip 30, which may be unwound from a reel, that is suitable for a making of a capacitor in accordance with the present invention is shown in FIG. 8 which is a cross-sectional view taken along line 8—8 of FIG. 5. The metallized dielectric strip is formed with a dielectric layer 32 of a thin film dielectric material, such as polyester, polypropylene, polystyrene, polycarbonate or other suitable material. A thin metallized electrode film layer 34 is applied to the upper surface of the dielectric layer 32 and a thin metallized electrode film layer 40 is applied to the lower surface of the dielectric film layer is such a fashion that unmetallized margin areas 36,38 extend longitudinally along the terminal ends of the strip 30 on opposite sides of the strip, as shown in FIG. 8.

In the embodiment shown in FIG. 8, the longitudinal dimension of the metallized strip 30 is shown in the direction of the arrows 46 while the narrow transverse dimension is shown along the arrows 48. The capacitor shown in FIG. 8 is pleated longitudinally four times along pleat lines 42 which extend along the length of the strip 30. The capacitor of the present invention, however, is not limited to one in which folding is along four pleat lines since a capacitor could be made in accordance with the present invention by pleating along any number of pleat lines greater than two. In the illustrated embodiment, the pleat lines are spaced so that the margin areas 36, 38 terminate about in the middle of the narrow dimension of the metallized strip 30. The extensions of the margin areas 36,38 beyond metallized electrodes 34,40 is preferably at least 0.020 inches.

After the winding has proceeded to one full turn in the illustrated embodiment, as shown in FIG. 5, the metallized pleated dielectric strip 30 is incorporated into the wound capacitor. This is achieved as shown in FIG. 5 and FIG. 8 by parting the foil 16 from the dielectric layer 12 and a foil 18 which remains in contact with the dielectric layer. The ends of the foil 16,18 and the dielectric layer 12 are therefore received between the pleats of the metallized dielectric strip 30 so that the foil 16 is in contact with the electrode 34 of the pleated dielectric strip 30 and the foil 18 is in contact with the electrode 40. While one initial turn of the foils 16,18 in the dielectric layer 12 are shown in FIG. 5 as receiving the pleated metallized strip 30 after one turn of the leads 20,22 should be apparent that the showing is illustrative only and that the pleated metallized strip may be joined with the wound dielectric layer 12 and the electrode foils 16,18 with a greater or less of amount of rotation of the leads 20,22, as desired.

After the pleated metallized strip 30 and the dielectric layer 12 and the foils 16,18 are joined together winding continues as shown in FIGS. 6 and 7 until a capacitor segment is completely wound as shown in FIG. 9. In order to obtain a high capacitance, there would be many turns of the pleated metallized strip 30 and only a few turns of the initial electrode foils 16,18 and their dielectric strip 12. For this reason the showing in FIG. 9 is diagrammatic only and a dotted line shown therein represents the edges of the metallized dielectric strip 30 while the leads 20, 22 are also represented. Because of the number of turns of the dielectric layer 12 and the foils 16,18 are so small they are not represented in FIG. 9.

The winding of the capacitor is then continued until the desired length of the respective foils 16,18 for the capacitance desired have been wound in and protected by several outer wraps of a heat-shrinkable dielectric strip 12 as can be seen in FIG. 9. When sufficient outer wraps of dielectric 12 have been applied, the wraps may be sealed to each other in any conventional manner such as by gluing or the application of adhesive tape or by heat sealing, utilizing a combination heat sealing and cutting bar 28 in the manner set forth in U.S. Pat. No. 2,950,070.

At the completion of the winding and sealing operation, the capacitor will appear as shown in FIG. 10 with the lead wires 20,22 extending from either end of the capacitor body member 26. Since the circular lead wires are relatively easily slideable relative to the capacitor body 26, a deformation such as a flattened region 20b, 22b, as seen in FIGS. 11 and 12, is formed on each lead wire 20,22 by means of a relatively large diameter (about one inch) cylinder (not shown) which presses the lead wire against a flat plate (not shown). After the lead wires have been deformed from a thickness d to a thickness d' which is preferably one-third to one-half the thickness d, they are pulled axially relative to the capacitor body 26 (FIG. 13) so as to bring the deformed portions 20b,22b into contact with the foil layers 16,18 at the center of the capacitor body. Since the deformation formed by a cylinder in contact with a circular wire member provides a smooth transition section between the two cross-sections of the wire, the deformed sections 20b,22b will readily slip over the surfaces of the foils 16,18 without injuring them. Although the type of foil used is not extremely critical, it has been found that tin foil provides somewhat better results than aluminum foil for the reason that tin foil will accommodate the heat shrinking of the dielectric without the puckering which is sometimes produced in aluminum foil. Furthermore, tin foil is very malleable and allows the lead wires to slip quite freely over its surface.

After the deformed portions 20b,22b of the lead wires have been pulled into the center of the capacitor body 26, the capacitor is subjected to heat for a limited period of time in order to cause the dielectric film layer 12 and preferably the layer 12' to also shrink and thereby exclude air from between the layers and bring the foil layers 16,18 into firm intimate pressure engagement with the lead wires 20,22. Although the capacitor, after heat shrinking of the layers 12,12' (FIG. 14), is ready for use without additional sealing, it is, of course, possible to apply additional sealing materials, if desired, or to bend the leads 20,22 in any manner desired such as into the radial lead style shown in FIG. 15.

FIGs. 16 through 18 illustrate a modified form of capacitor having stand-up, rather than axial, leads. This capacitor style is obtained by merely forming the flatted portions 22a',22b' on the lead wires at the same end so that when they are pulled into the capacitor body 26', their opposite ends 20',22' will project in the same direction. After the capacitor body 26' in FIG. 17 is heated to shrink the dielectric, it will be assume the shape shown in FIG. 18 at which point the lead wires 20', 22' may be bent in diverging directions and cut off as seen in FIG. 18.

The wound metallized capacitor constructed in accordance with the present invention is substantially noninductive and all of the convolutions of the capacitor were charged in parallel rather than in series and, therefore, will produce a capacitor with a low dissipation factor. By allowing the outer folds which contain the margins areas 36,38 to extend through approximately the center of the narrow dimension of the metallized strip 30, conductivity exists between each turn of the capacitor so that each end of the wound section is one continuous electrode and thus no spray operation is required when the long segment is completed. In addition this construction provides for a substantially uniform thickness across the pleat width thereby making for uniform winding without soft bands at the ends. In the construction of the capacitor care must be taken to insure that the outer surfaces of the metallized electrodes 34,40 are substantially free of nonconductive oxides, to assure good conductivity between the layers of the capacitor and a low resistance contact between the electrode foils 16,18 and the respective metallized electrodes 40,34. The construction of the present invention is also essentially low resistive to the charging current.

What is claimed is:

1. A method of making a wound capacitor comprising the steps of placing at least one dielectric layer and a pair of metallic electrode layers between a pair of lead wire members so that at least one of the dielectric is sandwiched between the pair of electrode layers, with said electrode layers each being in contact with one of said pair of lead wire members, said lead wire members being axially elongated and positioned transversely of said dielectric strip; rotating said lead wire members together as a unit to wind said dielectric strip and said electrode layers into an initial portion of a capacitor body; incorporating an electrical capacitor segment comprising a group of pleated layers comprising a dielectric film, a first metallized electrode film applied to one side of said dielectric film so that an unmetallized margin extends along one terminal end of said dielectric film, a second metallized electrode film applied to the other side of said dielectric film so that an unmetallized margin area extends along the opposite terminal end of said dielectric film, said incorporation being accomplished by inserting the terminal end of one of said electrode layers into said electrical capacitor segment in a manner such that it is contact with said first metallized electrode film and insertion of the terminal end of the other said electrode layers into said electrical capacitor segment so that it is in electrical contact with said second metallized electrode film and continuing the rotation of said lead wire members together as a unit to complete the winding of said capacitor body; supplying said lead wire members axially relative to said capacitor body and moving a deformed portion of each of said lead wire members into the central area of said capacitor body.

2. The method of claim 1 wherein both of said metallized electrode layers comprise steps of metal foil.

3. The method of claim 2 wherein a single dielectric layer is employed, the terminal end of said dielectric layer is inserted into said capacitor segments so that it is adjacent one of said metallized electrode layers.

4. A wound film capacitor comprising two electrode layers and at least one dielectric layer between said electrode layers, a transverse portion of each of said electrode and dielectric layers being positioned between a pair of lead wires which have axial portions about which the layers are wound, each of said electrode layers having a longitudinally extending portion thereof wrapped around a portion of the periphery of each lead wire so that said electrode layers are tightly held in intimate mechanical contact with said lead wires, said electrode layers and said dielectric layer being of a relatively short length and each of said layers having terminal ends, an electrical capacitor segment incorporated into said wound film capacitor comprising a plurality of pleated layers comprising a dielectric film, a first metallized electrode film applied to one side of said dielectric film so that an unmetallized margin extends longitudinally along one terminal end of said dielectric film, a second metallized electrode film applied to the other side of said dielectric film so that an unmetallized margin area extends longitudinally along the opposite terminal end of said dielectric film, said electrical capacitor segment being substantially longer than said electrode layers and said dielectric layer, the terminal end of one of said electrode layers being inserted into said electrical capacitor segment so that it is in electrical contact with said first metallized electrode film, a terminal end of said other electrode layer being inserted into said electrical capacitor segment so that it is in electrical contact with said second metallized electrode film and said electrical capacitor segment being wound into said film capacitor to form the outer portions thereof.

5. The capacitor of claim 4 wherein both of said electrodes are strips of metal foil.

6. The capacitor of claim 5 wherein the terminal end of said dielectric layer is inserted into said electrical capacitor segment so that it is adjacent one of said electrode layers.

* * * * *

UNITED STATES PATENT AND TRADEMARK OFFICE
CERTIFICATE OF CORRECTION

PATENT NO. : 4,166,285
DATED : August 28, 1979
INVENTOR(S) : Robert E. Bauer et al.

It is certified that error appears in the above-identified patent and that said Letters Patent are hereby corrected as shown below:

Column 4, lines 50-55 should be deleted to read

-- FIG. 15 is a view similar to FIG. 14 but showing the leads after they have been bent and cut off to form radial leads; --.

Claim 1, line 4, after "dielectric" add -- layers --.

Signed and Sealed this

Twenty-seventh Day of November 1979

[SEAL]

Attest:

RUTH C. MASON
Attesting Officer

LUTRELLE F. PARKER
Acting Commissioner of Patents and Trademarks